No. 851,322. PATENTED APR. 23, 1907.
T. E. & S. R. SIKES.
HAY PRESS.
APPLICATION FILED JULY 8, 1905.
2 SHEETS—SHEET 1.
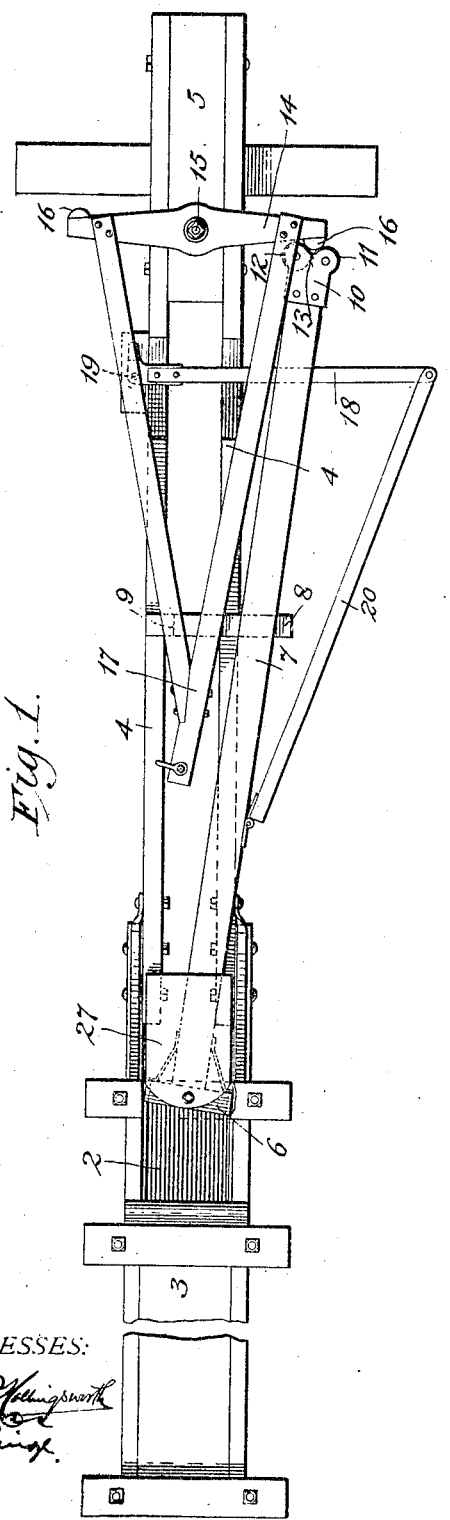
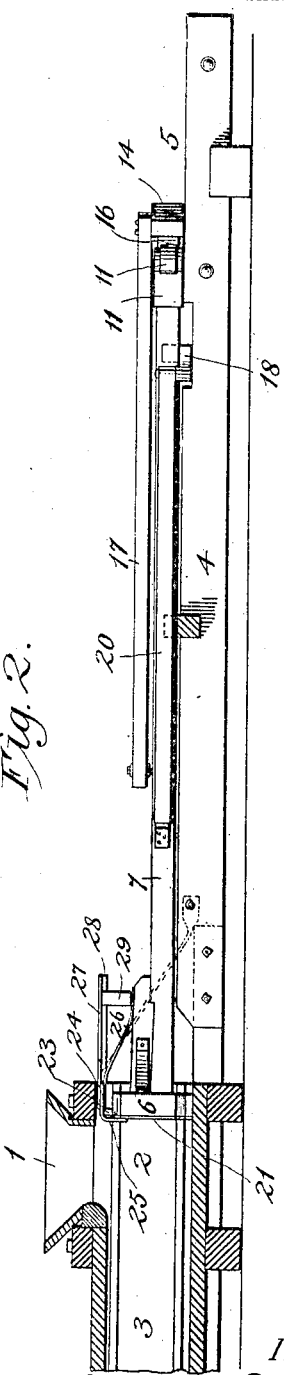
WITNESSES:
INVENTORS No. 851,322. PATENTED APR. 23, 1907.
T. E. & S. R. SIKES.
HAY PRESS.
APPLICATION FILED JULY 8, 1905.
2 SHEETS—SHEET 2.
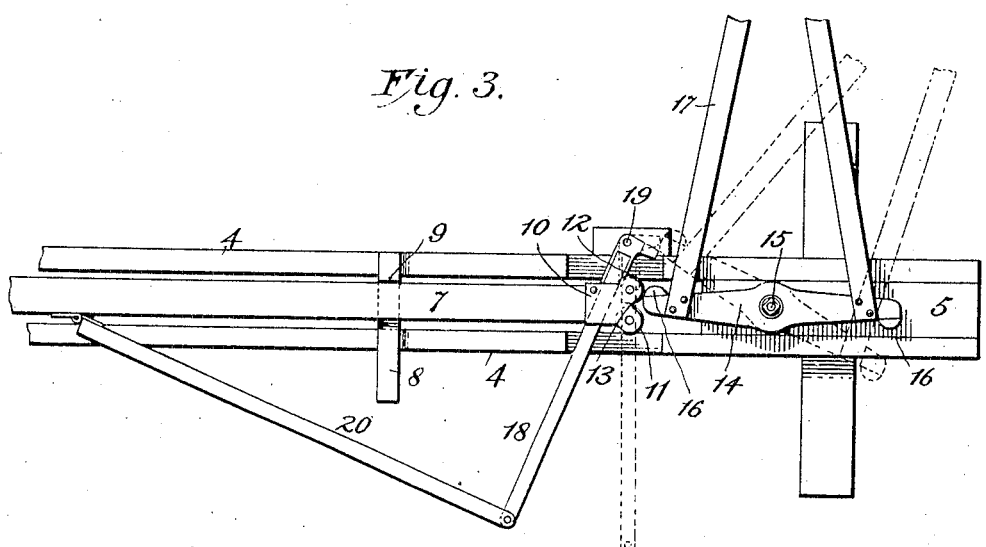
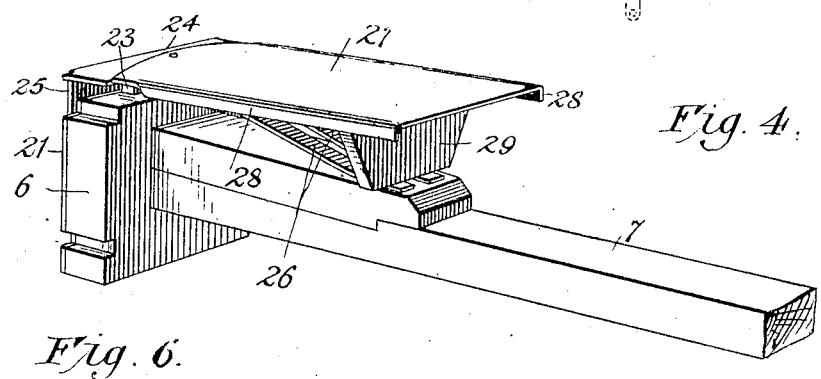
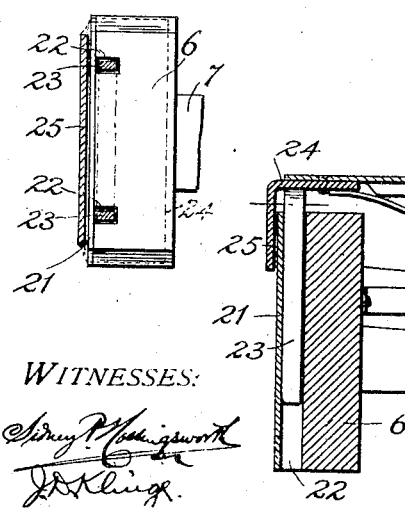
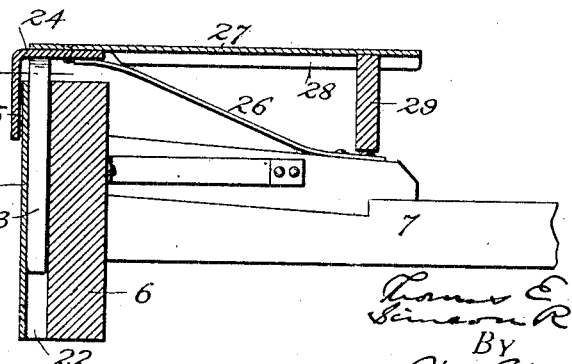
WITNESSES:
INVENTORS
By
Attorney

UNITED STATES PATENT OFFICE.

THOMAS EUGENE SIKES AND SIMEON RICHARD SIKES, OF HELENA, GEORGIA.

HAY-PRESS.

No. 851,322.     Specification of Letters Patent.     Patented April 23, 1907.

Application filed July 8, 1905. Serial No. 268,846.

*To all whom it may concern:*

Be it known that we, THOMAS EUGENE SIKES and SIMEON RICHARD SIKES, citizens of the United States, residing at Helena, in the county of Telfair and State of Georgia, have invented certain new and useful Improvements in Hay-Presses; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to hay presses, and it has for its object to provide improved means for actuating the plunger-head by which the hay is compressed and by means whereof the end of the power arm or lever will maintain a firm grip upon the end of the plunger-head rod during the compression period and at the proper time will pass from off said end with an easy movement, free from undue friction and irregular or jerking action in order to free itself from the plunger head rod.

It has further for its object to so construct the retracting rod and vibrating lever and arrange the same in relation to the power arm or lever that the latter will engage the short arm of the vibrating lever immediately on leaving the plunger-head rod and more promptly and to a greater degree retract the plunger-head so as to afford more time for feeding the hay to the feed chamber of the press than under other constructions.

It has further for its object to provide an improved construction of plunger head in order to prevent the plunger head from becoming wedged by overfeeding of the hay to the feed chamber or otherwise, thus insuring an easier reciprocation of the plunger head and preventing possible injury to the same or parts of the press, resulting from overfeeding the hay to the feed chamber.

To the accomplishment of the foregoing and such other objects as may hereinafter appear the invention consists in features of construction and in the combination of parts hereinafter particularly described and then sought to be clearly defined by the claims, reference being had to the accompanying drawing forming a part hereof and in which Figure 1 is a plan view of the press; Fig. 2 a vertical longitudinal section; Fig. 3 a plan of the plunger-head operating mechanism; Fig. 4 a perspective of the plunger head and shield; Fig. 5 a section view of plunger head and shield, and Fig. 6 a plan of the plunger head with its face plate in section viewed from below.

In the drawing the numeral 1 indicates a feed hopper, 2 a feed chamber and 3 the baling chamber which parts may be of any approved construction and from the forward part of which extend the timbers 4 upon the forward ends of which may be mounted or connected the power stand 5 which may be of any approved construction.

The numeral 6 designates the plunger-head from which extends the plunger-rod 7 which may rest upon a cross timber 8 having a stop block 9 to limit the lateral movement of the plunger-rod in one direction. The end of the plunger rod is provided with a metal cap 10 in which are mounted two metal rollers 11 and 12 between which is the notch or crotch 13, said rollers forming an extended roller-bearing surface at the end of the plunger-rod, and adapted to form a bearing for the ends of the power-arm or lever when said ends are brought into engagement therewith.

The numeral 14 designates the power-arm or lever which is pivotally mounted in any suitable way, for instance, by a pivot bolt 15 upon the power stand 5. This power-arm is provided at its ends with the oppositely-projecting shoulders 16 formed with rounded or convex faces adapted to contact with the double roller bearing end of the plunger-head rod in the rotation of the power-arm, said power-arm having also connected to it the sweep 17 to which the horse will be hitched for rotating the power-arm. By mounting the two rollers at the end of the plunger-head rod there is formed a special construction of bearing surface for the round or convex faced shoulders at the ends of the power-arm, said surface comprising two convex or rounded bearing points with an intermediate concave bearing point so that as the convex face of the power-arm passes over the end of the plunger-head rod, in contact therewith, an easy gliding movement of the power-arm takes place without undue friction and without a slipping and jumping action which would render the feed of the plunger-head irregular. For a portion of the rotation of the power-arm its convex-faced shoulder will fit in or span the concave between the two rollers at the end of the plunger-head rod and at the same time bear against the opposite convex surfaces formed by the two rollers, so that a firm and steady grip of the power-arm against the end of the plunger-head rod will be afforded. When the plunger-head rod reaches a position parallel or in alignment with the power-arm, lengthwise of the latter, the end of the power-arm will contact with the end of the plunger-head rod and move over the same under a steady and easy movement without unnecessary or undue friction which if permitted would result in an unsteady, irregular application of power. The advantages specified would to some extent be obtained if the features of construction specified were given to the end of the plunger-head rod otherwise than by the rollers but the best results are obtained by the use of the rollers for such feature.

For the purpose of retracting the plunger-head after it has completed its compression stroke, we provide a vibrating lever and retracting rod as follows. The lever is designated by the numeral 18 consisting of a long arm and a short arm and pivoted at 19, near its short end to a suitable part of the power stand, the long arm of the lever being extended under the plunger-head rod 7 and having its short arm lying in the path of the power arm so that the latter will contact therewith on leaving the end of the plunger-head rod and thus cause the long arm to swing in the direction of the power arm. The end of the long arm of the vibrating lever is connected by a draw-rod 20 with the plunger-head rod, said draw-rod having a hinged connection to the long arm of the vibrating lever and also to the plunger-head rod. The lever and the draw-rod are so proportioned and connected that when the plunger-head rod is at the limit of its compression stroke the lever will stand obliquely to the length of the plunger-head rod with its longest arm extending in the direction of the baling chamber, thus affording a longer retracting stroke and affording more time for charging the baling chamber. By pivoting the vibrating lever at its short-arm end at one side of the plunger-head rod and having the end of its long arm connected at the opposite side of the plunger-head rod to the latter by the draw-rod, and having its short arm arranged so that the power arm will contact therewith immediately on leaving the end of the plunger-head rod, a longer throw is given to the vibrating lever and the plunger-head rod is more quickly withdrawn and moved a greater distance than it otherwise would be, and thus more time is afforded for feeding the charge of hay to the hay box before the plunger head begins its compression stroke, and this has been found to be a material advantage.

For the purpose of closing the feed opening to the hay chamber during the compression stroke of the plunger-head, and to prevent the hay from binding or wedging between the plunger-head and walls of the hay chamber the following construction is provided. The face of the plunger-head is provided with a metallic facing-plate 21, back of which are formed the vertical grooves or channels 22 in which fit the stems or rods 23, preferably formed of light steel and which carry at their upper ends a plate 24 which covers the top of the plunger-head and which has a depending lip 25 that laps over the upper portion of the face-plate 21. This covering plate 24 is normally held above the plunger-head by means of a spring 26, which is connected at one end with the plate 25 and at its other end is connected to the plunger-head rod or a part thereof. The plate 25 is thus caused to yield under pressure so as to prevent the hay from binding or wedging between the top of the hay box and the plunger-head. The two stems or rods serve to guide the cover plate 24 and to brace the same against lateral movement, and the cover plate and depending lip prevents the possibility of the hay reaching said stems and the spring so as to interfere with their proper work. To prevent hay from falling back of the plunger-head during the stroke of the plunger a shield 27 is provided which is preferably made of light metal with down-turned edges 28 to stiffen the same, which shield is pivotally connected to the yielding cover plate 24 so that said shield will not be affected by any side play or movement of either the plunger-head or the plunger-head rod and thus it will be kept from binding against the walls of the press in any lateral movement of the other parts. This shield is preferably provided on its under side with a block or leg 29 which may rest upon the part of the plunger-head rod so as to afford a brace and support for the shield.

While the preferred construction and arrangement of the several parts have been illustrated and described in detail yet it is obvious that changes can be made therein and essential features of various parts of the invention be retained.

Having described my invention and set forth its merits, what I claim is:—

1. In a hay press, the combination of a plunger-head rod provided at its power end with independently journaled rollers arranged to lie one in advance of the other transversely to the length of said rod with their circumferential faces opposite each other, and a rotatable power-arm provided at its ends with oppositely-disposed shoulders to engage with the rollers of the plunger-head rod in the rotation of the power-arm, substantially as described.

2. In a hay press, the combination with a plunger-head rod having its power end formed with a bearing face comprising two convex surfaces with an intermediate concave surface, and a power-arm provided at its ends with oppositely-disposed shoulders to engage with the power end of the plunger-head rod in the rotation of the power arm, said convex surfaces being so disposed in relation to each other that each of said shoulders in the travel of the power-arm will at a point in its travel contact with both convex surfaces and span the space between the surfaces, substantially as described.

3. In a hay press, the combination with a laterally swinging plunger-head rod, and a power-arm substantially of the form shown, of a vibrating lever comprising a long and a short arm, said lever having its long arm extended across the plunger-head rod and fulcrumed at one side of the plunger-head rod, with the short arm lying in the path of the power-arm to be engaged by the end of said arm upon leaving the plunger-head rod, and a draw-rod connecting the long arm of the lever to the plunger-head rod on the opposite side of the plunger-head rod to where the lever is pivoted, said lever and draw-rod being so proportioned and connected that when the plunger-head rod is at the limit of its compression stroke said lever and said draw-rod will extend in opposite directions toward each other and obliquely to the longitudinal axis of the plunger-head rod, substantially as described.

4. In a hay press, the combination with the plunger-head formed with vertically disposed channels, of a cover plate fitting over the top of the plunger-head and provided with a depending lip fitting over the front of the plunger-head, stems projecting downwardly from said plate and fitting, one in each of said channels to guide and brace the cover plate, and a spring located beneath said plate and back of said guide stems and serving to sustain said plate, substantially as described.

5. In a hay press, the combination with the plunger-head, of the yielding cover plate comprising the plate lying over the top of the plunger-head and downwardly extending lip lying in front of said head, stems or rods attached to said plate and fitting in channels formed in the plunger-head, one stem in each channel, to guide and brace said plate, a shield pivotally connected to said plate, and a spring located beneath said shield back of the plunger-head and connected with said cover plate and serving to sustain both the plate and shield above the plunger-head, substantially as described.

In testimony whereof we affix our signatures in presence of two witnesses.

THOMAS EUGENE SIKES.
SIMEON RICHARD SIKES.

Witnesses:
J. F. Cox,
OLIN PHARR.